United States Patent [19]

Silver

[11] 3,883,068
[45] May 13, 1975

[54] MOISTURE BARRIER PACKAGE FORMED FROM LAMINATED BLANK

[75] Inventor: Stanley Milton Silver, London, England

[73] Assignee: Paxall, Inc., Chicago, Ill.

[22] Filed: Apr. 3, 1973

[21] Appl. No.: 347,464

[30] Foreign Application Priority Data
Apr. 10, 1972 United Kingdom............... 16351/72
Aug. 1, 1972 United Kingdom............... 35779/72
Nov. 4, 1972 United Kingdom............... 50956/72

[52] U.S. Cl............. 229/31 R; 229/3.1; 229/14 BA; 229/14 BL; 229/48 T
[51] Int. Cl............................. B65d 5/56; B65d 5/62
[58] Field of Search............ 229/14 R, 14 B, 14 BA, 229/14 BL, 31 R, 32, 48 T, 3.1

[56] References Cited
UNITED STATES PATENTS

| | | | |
|---|---|---|---|
| 695,273 | 3/1902 | Birnie et al. | 229/14 BA |
| 1,704,175 | 3/1929 | Coale | 229/14 BA |
| 2,363,425 | 11/1944 | Klein | 229/14 BA X |
| 2,387,272 | 10/1945 | Klein et al. | 229/14 BA X |
| 2,785,845 | 3/1957 | Stenger | 229/14 BA X |
| 2,959,336 | 11/1960 | Masse et al. | 229/14 BL |
| 3,223,230 | 12/1965 | Bianchi | 229/14 BL X |
| 3,257,068 | 6/1966 | Wright | 229/14 BA X |
| 3,536,248 | 10/1970 | Odenhager et al. | 229/32 X |
| 3,829,005 | 8/1974 | Hackenberg et al. | 229/14 BL X |

Primary Examiner—John W. Huckert
Assistant Examiner—Charles Gorenstein
Attorney, Agent, or Firm—Fitch, Even, Tabin & Luedeka

[57] ABSTRACT

Laminated blanks for forming moisture-resistant packages are produced from a substrate, such as cardboard. A continuous web of substrate is perforated and fold lines formed. Perforated regions are stripped therefrom prior to laminating with moisture-resistant heat-sealable sheeting using a heat-weakenable laminating material. Thereafter, a multitude of rows of individual blanks are profiled by die-cutting the laminated web. The blanks have unsupported sheeting regions disposed along an edge portion of the substrate which provide membranes or webs that are adapted for sealing to another portion of the laminated sheeting to form a continuous barrier that may be used to prevent wicking in an erected package.

4 Claims, 16 Drawing Figures

MOISTURE BARRIER PACKAGE FORMED FROM LAMINATED BLANK

The invention relates to packaging and more particularly to producing moisture barrier containers. Moisture-resistant containers include those pack styles known in the trade as integral bag-in-the-box packages and also those packages that have a moisture-resistant wrapping secured thereover. The subject invention is perhaps more directly relevant to package styles known as single-walled barrier cartons. Characteristically, single-walled moisture barrier cartons have layered on at least one surface thereof a moisture-resistant coating, such as polyethylene. Whereas many such packages have been able to provide adequate surface penetration resistance, certain problems have heretofore existed with respect to the lateral movements of migrating substances (e.g., the wicking of fats, oils, moisture vapour and gases). U.S. Pat. No. 3,577,699 teaches adhering a thermoplastically adhesive sheeting to a board substrate by a heat-weakenable laminant whereupon, after the local application of heat, the laminant is absorbed into the porous board so that the sheeting may be cleanly detached from the substrate. The description of the preferred embodiments that follow describe not only the subject invention, but includes the technique of controlled "membrane delamination", wherein selected areas of the partially folded blank are heated to perform the twofold function weakening the laminant so as to delaminate the sheeting from the board substrate in the said areas and to fuse together abutting surfaces of the sheeting.

Other prior art of interest, known to the inventor, which however does not provide solutions to the objects listed later in this specification, include U.S. Pat. No. 2,363,425 (Klein). This disclosure of Klein involves a multiple blank which is perforated prior to having one or more moisture-resistant sheets applied thereto by means of a heat-weakenable laminant. However, the sheeting is not a thermoplastic sheeting and the process involves a profiling operation in which an attempt is made to perform the technically almost impossible action of scoring through the substrate but not into the layer of attached sheeting. Moreover, the advantage of doing all the processing of a series of blanks on a web has not been appreciated. The laminant is heated to permit the complete removal of a portion of the substrate without using such portion in the formation of the package. U.S. Pat. No. 2,387,272 (Klein et al) discloses a method in which the processing of a single row of blanks on a web is effected but without an initial perforation step. Again it is proposed to cut through the substrate without penetrating the attached sheeting. The substrate is not perforated prior to having the moisture-resistant sheeting adhered thereto by a heat-weakenable laminant. In this disclosure the moisture-resistant sheetings referred to are not heat-sealable. U.S. Pat. No. 2,432,053 (Waters) describes the production of a single row of blanks from a web which is subjected to a perforating operation prior to the attachment of thermoplastic paper by spots of adhesive. The grain of the board substrate runs incorrectly with respect to the blank. The formation of the package does not and cannot depend on delamination of the paper from the substrate.

British Patent Specification No. 808,223 (The Metal Box Co. Ltd.) shows cutting a hole in a continuous web of substrate that is being used to form a single row of carton blanks together with the removal of a side strip, thereafter extruding a moisture-resistant layer of polyethylene to the speed substrate portions and thereafter transversely cutting the laminate into individual blanks having portions of the polyethylene film layer unsupported in sealing areas. However, such blanks are not suitable for use on high-speed folder gluers.

The subject invention is concerned with the production of a blank that includes unsupported areas of moisture-resistant sheeting, which are disposed immediately adjacent cut edges of the substrate, which unsupported areas are adapted for sealing. As used in this application, the term "sealing" includes the formation of a side seam or joint or the like, as well as closing an open end or top of a package or the like. The unsupported sheeting, which may be connected to the substrate along only a single edge, provides membrane or web areas which may be employed to at least partially form and/or close a container by selectively heat-adhering to at least another impermeable sheeting area of the pack. Such unsupported membranes can produce migration-proof joints, or more precisely, joints that equalize migration resistance to penetration resistance. Basically, the novel blanks employ the production technique of defining a partial blank by perforating (i.e. forming openings in) a continuous web of substrate and, subsequent to such perforation, maintaining longitudinal and transverse rows of partially defined blanks in a continuous relationship to one another so that the substrate may be laminated with a continuous web of moisture-resistant heat-sealable sheeting using a heat-weakenable adhesive material. A subsequent profiling stage separates the blanks from one another.

In carrying the present invention into effect, portions are removed (to form openings therein) from a continuous web of substrate that is being fabricated into a multitude of longitudinal rows or blanks, thereafter a continuous web of a moisture-resistant sheeting across the entire width of the web is laminated using a heat-weakenable laminating solvent or adhesive material and subsequently the complete lamination (substrate and sheeting) is cut along certain lines, and additionally the sheeting material alone is cut along other lines, in a profiling operation that forms the individual blanks.

It is one object of the invention to provide a method that is common to making a bag-in-the-box and box-in-the-bag type of carton. Another object of the invention is to provide a method which is common to both end-loaded and top-loaded moisture barrier packages. A further object is to provide a method for the production of blanks adapted to form a variety of packages that are equally as resistant to wicking as to penetration. Another object of the invention is to produce a blank that has, at select cut edge portions, unsupported moisture-resistant sheeting laminated thereto by a weakenable material. A further object is to produce such blanks in multiple longitudinal rows on conventional die-cutting and laminating machinery for converting paper and board. A still further object is to produce such blanks having sealing membrane areas that are unsupported by a substrate and other sealing areas that are potentially cleanly detachable from a corresponding substrate portion. Yet another object is to provide an improved method for making moisture-resistant packages using laminated blanks. Still another object is to provide an improved package formed from a laminated blank.

To make clear the versatility of the invention, three pack styles are described in the following detailed description and in the accompanying drawings wherein.

Figure 1:
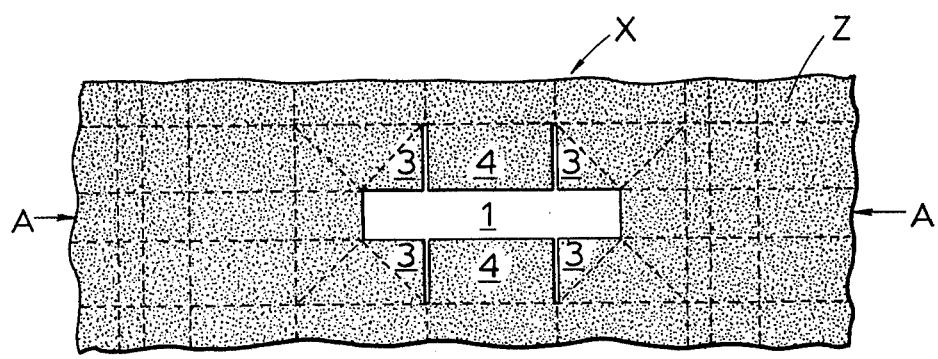
FIG. 1 is a fragmentary plan view of board showing portions of what will constitute six blanks once profiling of the blanks has caused separation.

Shown in plan in FIG. 1 are fragments of what will become six blanks subsequent to further processing, as viewed from the interior unprinted surface of a board X (shown stippled) to depict the presence of a heat-weakenable laminating material Z, which is preferably a microcrystalline wax blend coating. Principally shown are end portions of two blanks each including two gussets 3 and a flap 4, it being understood that the opposite ends of the two blanks, which ends are not shown, would be identical to what is shown. Common to these two blanks is a removed perforated area 1 which is located between end flap sealing areas of both blanks. The fragments shown of the laterally adjacent four blanks will be separated during the subsequent profiling and separation steps. Severance locations between the gusset 3 and flap 4 are shown as solid lines, and fold lines are shown as broken lines. During the first die cutting stage, select perforating is imparted to a continuous web of board X, which may be cardboard or fiberboard, stiff paper or the like, and the board occupying the area 1 is stripped from the web prior to laminating with a moisture-resistant heal sealable sheeting Y. The sheeting may be coated film, coated metal foil, coated paper, a thermoplastic film or the like. The first die-cutting stage might include other perforating in addition to the removal of the area 1, such as making spaced cuts and slots, and usually also includes the formation of fold lines, such as creases or scores, which define the body panels 32, 33, 34, 35 and sealing panels 4, 3, 30, 31, 37, 38, 39. Arrows A indicate the paperboard grain direction which is longitudinal of the web, and the travel of the continuous web might follow either arrow direction.

Figure 2:
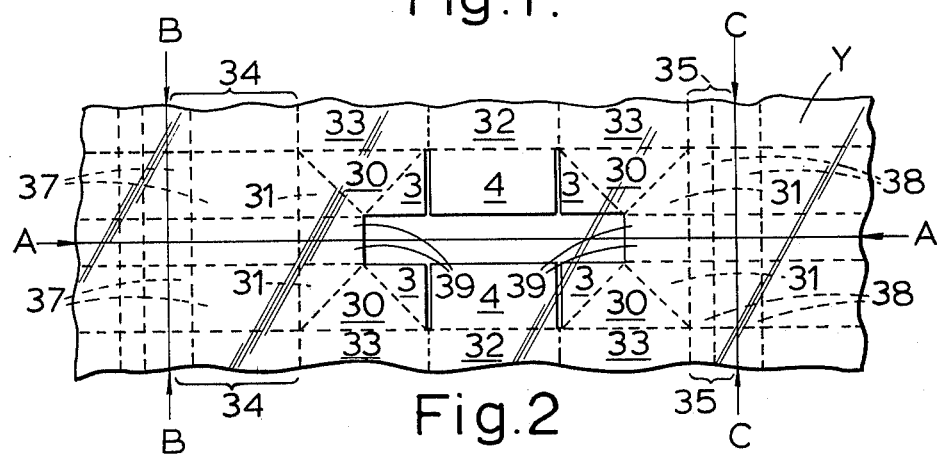
FIG. 2 is similar to FIG. 1 showing the blanks after laminating and profiling.

FIG. 2 shows the portion of the continuous web shown in FIG. 1 subsequent to laminating a moisture-resistant transparent sheeting Y (shown shaded) on to the board substrate and subsequent to profiling to create individual blanks by severing along lines indicated by arrows A, B and C. The line of severance indicated by arrows A cuts the combination of the substrate and the sheeting jointly along the grain direction, and it also cuts the sheeting separately in the region 1 to create for each blank an unsupported sealing fin 2 of the sheeting material. The result is a blank formed of a unitary substrate to which a sheeting is adhered by a weakenable laminating material. Inasmuch as the blanks are rectangular in shape, these relatively simple profiling functions may be carried out in-line with a conventional laminator. The slitting of the web into longitudinal rows may be done with conventional rotary knives, and the severing of the blanks in the rows may be performed by a reciprocating shear signalled by a photoelectric scanner which gets its signal from either a print surface or from the stripped area 1.

Figure 3:
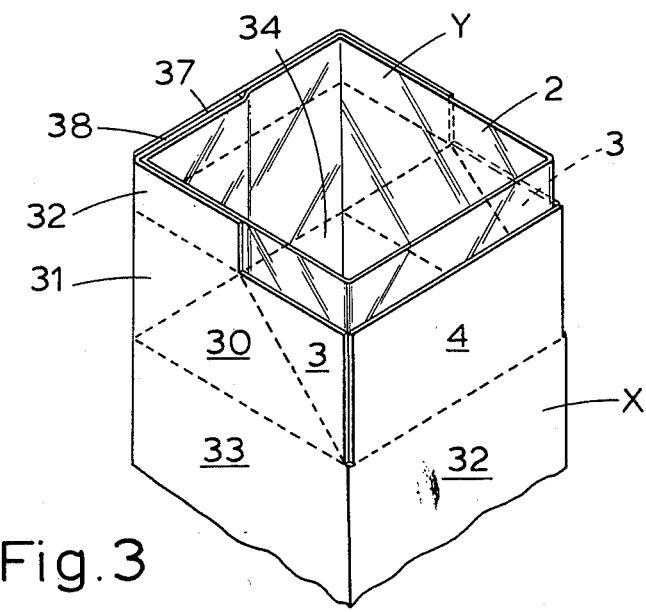
FIGS. 3, 3a, 3b are isometric views of one end of a tubular carton showing three stages in the folding thereof.
Figure 3A:
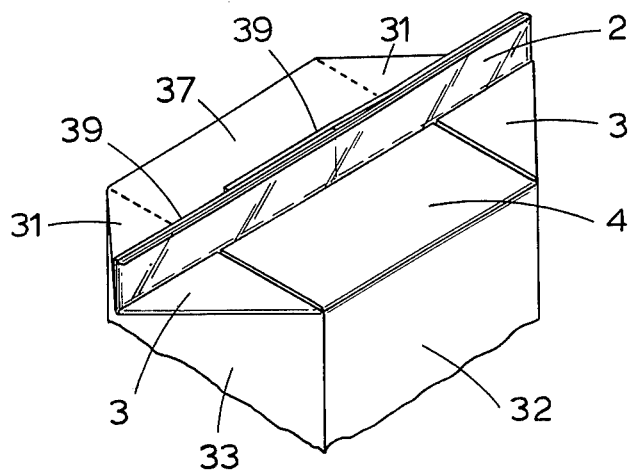
Figure 3B:
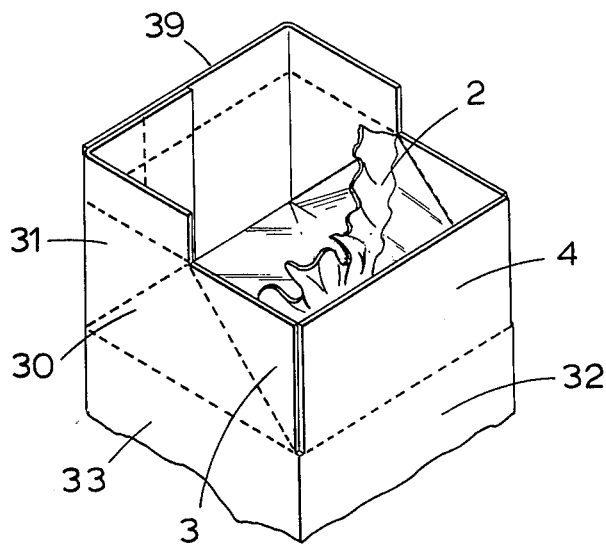

FIG. 3 shows an isometric view of one end of an open-ended tubular carton. The gusset configuration is basically as described in U.S. Pat. No. 3,577,699 except for the provision of the unsupported fin 2 of sheeting membrane. The method of side seaming between body panels 34, 35 and sealing panels 37, 38 is not described herein and may be as described in U.S. Pat. Nos. 3,411,694 and 3,577,699. Preferably, however, the side seam is formed by the method described in the complete specification of copending application Ser. No. 234,105 of the applicant, wherein one side of the sheeting membrane is folded back and heated so as to provide a two-ply edge which is then brought into overlapping relation with the other side of the membrane to which it is caused to adhere. The unsupported sheeting sealing fin 2 is disposed immediately above portions of the panels that will form the end closure. The supported edge margins of fin 2 are adhered to the gussets 3 and closure flap 4. One advantage of having a portion of the sheeting unsupported is that, once the gussets are outfolded as shown in FIG. 3a and the unsupported fin 2 comes into flat abutment with the opposed portions of the sheeting that cooperates to form the fin seal, even though the cooperating portions are laminated to fin extensions 39 of the sealing panels 31, 37, 38, pressure and heat sufficient to fuse the thermoplastic sheeting together to form the sealed fin may be transmitted directly through the unsupported fin 2, thereby minimizing heat transfer loss. The heating is also used to weaken the laminating material so as to enable the membrane sheeting to separate from the board substrate of the areas 3, 4, 31, 37, 38. Where the laminating material is a micro-crystalline wax blend, this, when heated, is absorbed by the board. When this delamination has been effected, the gussets are infolded again through the position of FIG. 3b from which it will be seen that the inner moisture-resistant sheeting forms a fin-sealed container that will lie wholly inside the board substrate areas of the carton when the gussets are fully infolded with the flap 4 folded over and sealed over the other infolded areas. If the pre-severance between the flap 4 and gussets 3 is omitted the final closure of the board areas may be effected as described in the aforesaid U.S. Pat. No. 3,577,699.

Figure 4:
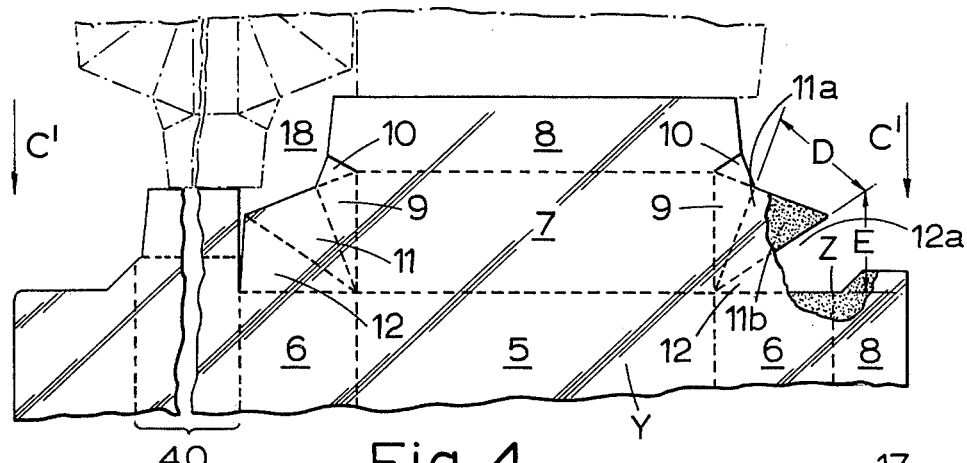
FIG. 4 is a fragmentary plan view of another blank style after laminating and profiling and showing in phantom the adjacent and butting edge portion of another blank as located in initial forming.

FIG. 4 shows one edge portion of a blank disposed alongside and abutting another fragmentary blank shown in phantom in the location it might occupy within a continuous laminated web. In the profiling stage as depicted, cutting will preferably occur generally along the grain of the web between the full line blank and the blank shown in phantom, and cutting will occur across the grain of the blank generally along the arrow C'. The view looks toward the surface of the blank which will form the interior of the container, and a part of the transparent sheetings Y (shown in discrete shading) is broken away to show the unitary board substrate coated with laminating material Z in one corner gusset region. The blank is the style referred to in the trade as a top-loading tray with gusseted corner connections and having an integral cover. The base 5 of the tray is connected to opposed sidewalls 6 and opposed sidewalls 7. Connected to the upper edge of sidewalls 6 and 7 are sealing flap panels 8. Connected laterally to opposite edges of sidewall 7 and triangular panels 9 to each of which is connected at an upper edge a triangular panel 10 that has an edge lying adjacent panel 8 but is separated therefrom by a cut. Also connected to triangular panel 9 is panel 11, and connected to panel 11 is triangular panel 12 which is further connected to panel 6. Panels 11 and 12 are further indicated in FIG. 4 by references D and E. The broken-away portion shows the panel 11 comprises sheeting material 11a as well as a substrate 11b, while panel 12 comprises wholly unsupported sheeting lying over a triangular vacant area 12a from which the substrate has been stripped.

Figure 4A:
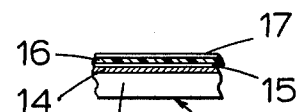
FIG. 4a is a typical lamination from which the blank could be struck.

The subject pack style is ideally adapted to employ aluminium foil though in these illustrations and for purposes of visual clarity, transparent sheeting is depicted. In FIG. 4a, one typical lamination is shown comprising a substrate X constituted by board 13, a layer of laminating material Z in the form of micro-crystalline wax blend 14, polyethylene 15, biaxially orientated polypropylene sheeting 16 and polyethylene 17. Because a non-heat-sealable sheeting 16 is illustrated, a heat-sealable coating (such as 15, 17) is applied to both sides and a coating is used which is heat-sealable only at a temperature above the melting point of wax blend. However, if the exterior of the substrate X is either overall or pattern coated with a thermoplastically adhesive material, then the sheeting 16 need only be provided with thermoplastically adhesive characteristics on a single side. The blank shown is made by two die-cutting stages. In the first stage, the substrate area 12a in the region of the panel 12 is cut and removed from the web, and simultaneously, fold lines are imparted to the continuous web at the desired locations. Thereafter, the sheeting is laminated thereon. Subsequently, the blanks are profiled, and the regions marked 18 are cut and stripped from the laminate. Each of the regions 18 is common to two blanks, and to remove these regions, both the board and the sheeting are cut through along certain lines while only unsupported sheeting is cut adjacent the region 12.

Figure 5:
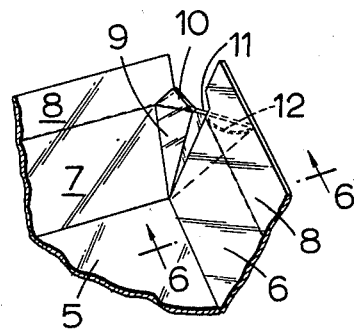
FIG. 5 is a perspective of one corner of the blank shown in FIG. 4 being erected in a tray corner joint.

FIG. 5 shows in perspective the corner of the tray particularly with respect to zones D and E as shown in FIG. 4. Sidewalls 7 and 6 have been angularly positioned in relation to base 5. The unsupported sheeting membrane 12 is shown in dotted outline as being backfolded.

Figure 6:
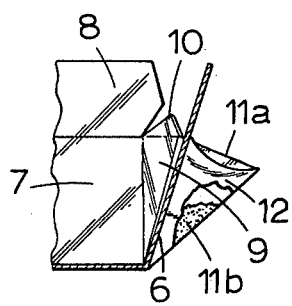
FIG. 6 is a cross-section of one corner of the partially erected tray, taken generally along line 6—6 of FIG. 5, prior to heat-sealing the gusset to the tray side wall.

FIG. 6 is a cross-section of the corner shown in FIG. 5 at a slightly later stage of formation. Side panel 6 has its lateral edge in abutment with the fold line separating panels 9 and 11. Panel 11 includes the substrate 11b plus the laminated sheeting material 11a, and unsupported membrane 12 is backfolded to generally contact the sheeting 11a which covers the panel of the blank to which the unsupported membrane is immediately attached or hinged. A portion of membrane 12 is broken away to reveal the sheeting 11a laminated to the substrate panel 11b, and a portion of the sheeting 11a is broken away to reveal the wax-coated substrate 11b which is shown stippled. It would be at this stage of assembly that an interior male mandrel would force the blank through a forming cavity. Hot air may first be locally applied to membrane 12 in an amount sufficient to render activated all thermoplastic adhesive surfaces of the membrane so that, upon folding of panel 11 into pressure contact with the exterior of panel 6, adhesion between all cognate membrane and board surfaces is effected. The heat and pressure are sufficient to provide both a fusion and adhesive seal. That is to say, the membrane sheeting 12 is fused to the membrane sheeting 11a and the latter adheres to the substrate 11b when the intervening wax has been melted and absorbed by the substrate 11b.

Figure 7A:
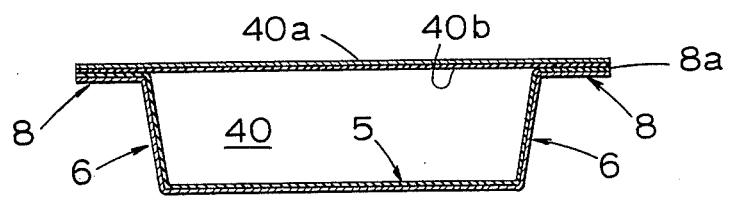
FIG. 7a is a cross-section of the tray of FIG. 7 shown with the top cover folded down.
Figure 7:
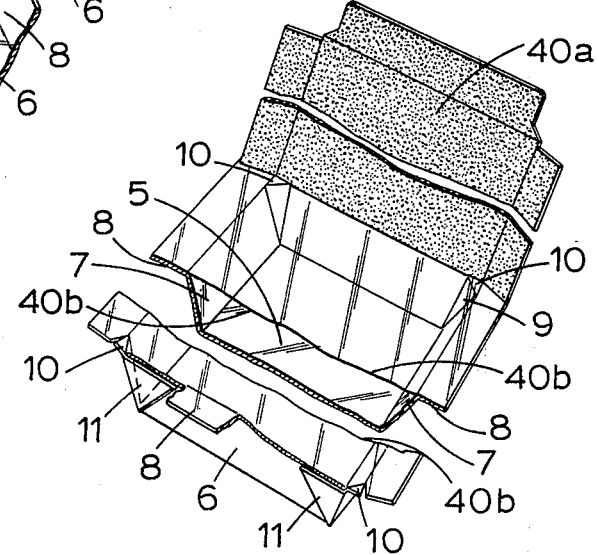
FIG. 7 is a perspective of the assembled tray, top sealed into pack form by a delaminated top cover membrane

FIG. 7 shows the tray fully erected with all four corners stayed and with the board substrate 40a of a cover 40 separated from the sheeting material 40b which has been heat-sealed to flaps provided by the panels 8, 10 bordering the tray, which have been outfolded. This sealing is effected by first folding down the cover 40 so that it contacts the flaps 8, 10 as indicated in the cross-section through the tray shown in FIG. 7a. This shows the cover sheeting material 40b in contact with the flap sheeting material 8a. Heat applied to the cover seals the sheeting material 40b to the sheeting material 8a and melts the micro-crystalline wax between the layers 40a and 40b, the wax being absorbed by the board substrate 40a which can then be raised to the position of FIG. 7. It will be seen that the cover includes sealing flaps substantially corresponding in shape to the flaps 8 bordering the tray. In the aforesaid heating process all sealing flaps are exposed to heat and pressure along the immediate periphery of the tray, and the centre portion of the cover is exposed to heat alone. The application of heat and heat with pressure causes both the delamination of the sheeting 40b that had been adhered to the cover substrate 40a including its flap appendages as well as the fusion of the delaminated sheeting 40b to the tray sealing flaps 8. The heat and pressure required for this is not so great as that required for the corner elements 11a, 11b, 12 because at the flaps 8, 10 the sheeting membrane must not adhere to the cover substrate 40a. The resultant pack is a nestable tray which, once filled with product and top sealed, comprises a bag-within-a-box. Subsequent to delamination, all of the sealing flaps bordering the tray and the cover may be infolded and glued or otherwise adhered so that the completed pack results in a bag wholly within an exterior printed carton.

Figure 8:
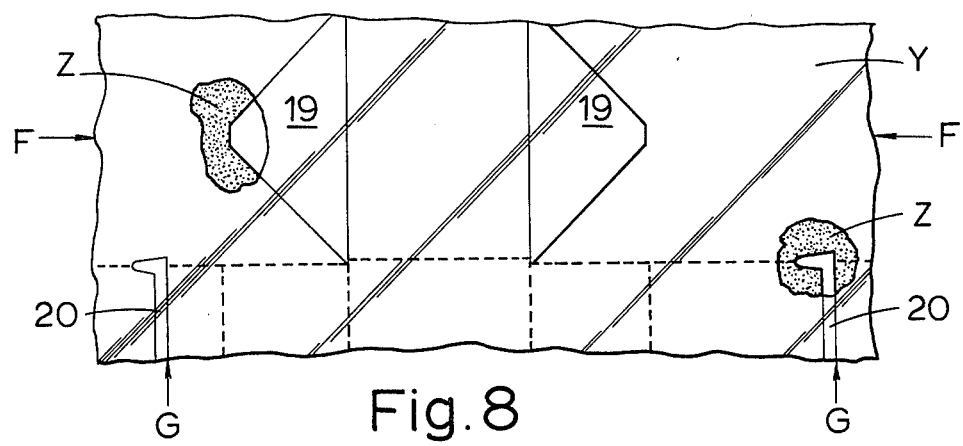
FIG. 8 is a fragmentary plan view of still another embodiment showing the pre-cut substrate of six blank fragments having adhered thereon a transparent sheeting, indicated by discrete shading, prior to profiling.

FIG. 8 shows a plan view of what will become portions of six individual blanks subsequent to a second die cutting stage, with the view looking toward the exterior of the blanks. Each such blank produces a carton within a hermetic overwrapping. Some features of this overwrapping are the subject of co-pending application Ser. No. 316,238 of the applicant. Whereas one preferred sheeting is aluminium foil, for purposes of visual comprehension, the sheeting Y is shown as being transparent. For example, the lamination of FIG. 4a may be employed. Parts by the transparent sheeting Y are shown broken away to show the outline of the unitary board structure, coated with laminating material beneath. The first cutting stage creates cut-out areas 19 and 20 in the substrate as well as fold lines, which are shown as broken lines. However, when non-stretchable sheetings are employed, certain fold lines should preferably be imparted to the blank during the profiling stage. Subsequent to the stripping of areas 19 and 20, sheeting is adhered to the multiple rows of blanks which remain in continuous web form. It is only subsequent to laminating that the individual blanks are profiled into a somewhat irregular shape substantially along the line defined by arrows F (which is along the grain direction of the continuous web) and along the straight edge lines designated by arrows G. Each blank produces an end-loadable carton having two pairs of opposable body walls, each of which has closure flaps at both ends, and a side seam flap. The subject pack produces a sheeting-to-sheeting side seam as well as sheeting-to-sheeting end seals.

Figure 9:
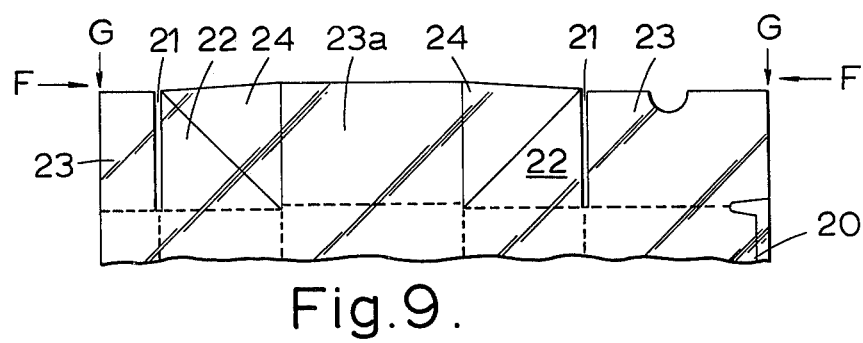
FIG. 9 is a portion of a single blank shown subsequent to a second stage die-cutting from the lamination depicted in FIG. 8.

FIG. 9 shows the main blank shown in FIG. 8 after it has been profiled and separated from the other five blanks. The blank comprises a unitary substrate to which the sheeting is adhered by a weakenable laminating material. The profiling of the sealing flaps provides slots 21 separating gusset members 22 from closure panels 23. Disposed between the gusset panels 22 and the outer closure panel 23a are unsupported gusset webs or membranes 24 resulting from the stripping of the areas 19. Disposed at the cut free edge of one body panel is the sheeting sealing membrane or web which results from the provision of the stripped area 20.

Figure 10:
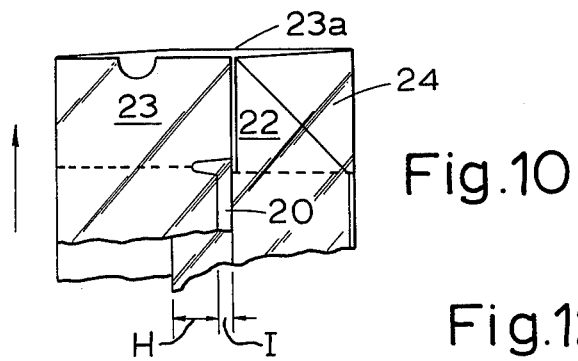
FIG. 10 is a plan view of a flat folded tube wherein the sheeting forms a continuous wrapping about the exterior of a side-seamed tube of a substrate.

FIG. 10 shows the blank of FIG. 9 after it has been side seamed into a flat folded tube, the side seam being formed with overlapping edges of the blank. The arrow indicates the direction of travel on a conventional folder-gluer. The membrane area 20, which was unsupported now overlies a portion of the side seam flap, which constitutes zones H and I. At least one surface of the sheeting is thermoplastically adhesive. Reference to the sealing region by longitudinal zones is done to indicate that adhesion can be effected with flame sealing along the zone I while adhesion may be caused by the employment of an adhesive, such as polyvinylacetate (PVA), at the zone H. The flame sealing of thermoplastic materials is instantaneous and provides an instant ply bond; however, PVA may take a substantial period of time to develop tacking strength. Inasmuch as flame sealing over a board area may cause unwanted delamination in the preferred blank construction, it is preferred that the line of flame sealing be fairly narrow so that any accompanying delamination is equally as narrow. It is for this reason that the side seam joint is reinforced by a secondary method of adhesion in zone H.

Figure 11:
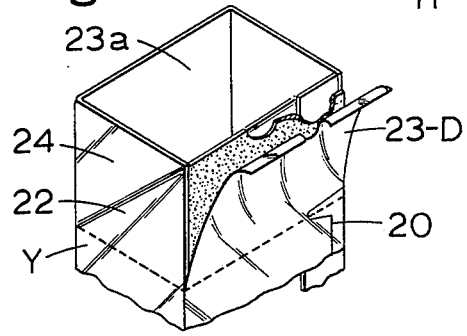
FIG. 11 is an isometric view of the open-ended tubular carton of FIG. 10 with one closure panel delaminated.

FIG. 11 shows an isometric view of the tube as shown in FIG. 10 in open-ended form. A novel feature described in the aforesaid application Ser. No. 316,238 is the delamination of an exterior sheeting member, shown here as 23-D. The delamination is caused by the application of local heat to the exterior surface of the notched inner closure panel 23.

Figure 12:
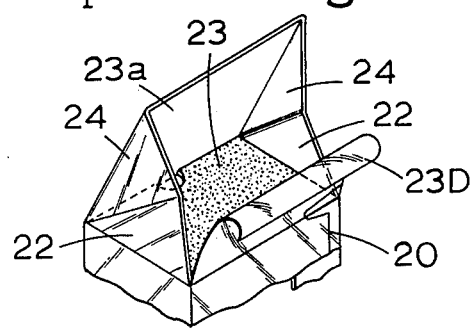
FIG. 12 is a view similar to FIG. 11 at a later stage, with the denuded substrate panel having been positioned and with web-gusset members folding inward.

FIG. 12 shows a stage subsequent to that shown in FIG. 11. Denuded inner panel 23 has been positioned to overlie the open-ended tube, and delaminated sheeting member 23-D is now shown in a different plane from the substrate from which it has been stripped. Gusset members 24 and 22 are being infolded at their junction in a manner so that each of the unsupported membranes 24 is backfolded against the sheeting-carrying surface of the gusset panels 22 and against the undersurface of the unnotched closure panel 23a. As a result of gusset infolding, the outer closure panel 23a is downfolded. Immediately thereafter, sheeting member 23-D is folded over the exterior surface of the still-laminated outer closure panel 23a and heat sealed thereon. Adhesion can be efficiently effected by applying hot air to the thermoplastically adhesive surfaces of the unsupported membranes 24 and supported sheeting member 22 and applying pressure after the closure surfaces are brought into contact. One end seal would be made prior to filling, and subsequent to the filling of product, the second end seal would be made in identical fashion.

What has been described are three separate and distinct pack styles. The first (FIGS. 1 to 3) is an end-loaded hermetic carton some aspects of which have been described in previous patents. FIGS. 4 to 7 illustrate a wholly distinct pack style known in the trade as a top-loaded lidded carton, the interior impermeable bag lining of which would be without precedent. Illustrated in FIGS. 8 to 12 is an end-loaded pack which is unlike the first described end-loaded pack because the impermeable sheeting is on the exterior of the pack in the manner of an overwrap. One thing common to the subject blanks and pack styles is that, at various sealing areas, the board substrate X has been separated from the sheeting Y. In the production of all three illustrated blanks, perforated areas are created in the continuous web which provides a multitude of longitudinal rows of blanks, and the interior areas or plugs resulting from such perforations are stripped therefrom. Then, the partially formed blanks while still a part of the continuous web are laminated with a heat-sealable sheeting Y using a weakenable laminating solvent or adhesive material Z. During a subsequent die cutting stage, the combined sheeting and substrate is severed along such a path that unsupported sheeting is also cut.

To produce blanks of the character as aforesdescribed, several practical manufacturing techniques may be employed. One is by printing the substrate in reel form by rotogravure, web offset or flexography and thereafter registering the printed web in a first die cutting stage. Commercially available techniques for registration include a mechanical linkage between an in-line printer and a die cutter or alternatively the photoelectric registered feeding of the preprinted web to a die cutter. Thereafter, the printed and partially defined blanks, while still in reel form, may be presented to a conventional laminator, employing a heat-weakenable coating which preferably should be a microcrystalline wax blend. The coating is preferably applied to the board, and a suitable sheeting is adhered thereon. The separation of the blanks thereafter may be caused by slitting and sheeting in register, or by just register sheeting a plurality of rows of blanks. In the latter method, rows of blanks having been registered and sheeted could then be presented to a conventional sheet fed platen die cutting machine for a second cutting or profiling stage. Still another commercially practical method of production would be to die cut unprinted board from a reel, thereby defining a portion of the blank configuration, and while the blanks remain part of the continuous web on the reel, laminating a sheeting thereon and rewinding the lamination. The rewound reel could then be presented to existing machinery whereby the partially precut, laminated board would be unwound, profiled by a second die cutting operation and then the cut and creased blanks would be printed by offset lithography.

For producing the subject blanks at a linear speed of 800 feet per minute, relatively inexpensive machinery is commercially available. Whereas the following description concerns itself with a single machine wherein all processes are performed continuously and in-line, it is obvious that if desired the reels of material can be rewound at any one of several appropriate stages for further processing on separate machines. An unprinted reel of board is unwound from a back-stand and passes between a rotary die and a co-operating rotary anvil during or immediately after which the scrap areas are removed. The partially cut board which also may define fold lines is then waxed on the side that is to contact the lining material which is also being unwound from a back-stand. The board and liner sheeting are brought into pressure contact by co-operating nipping rollers and the combined lamination is brought into contact with a chilling roller to arrest the penetration of the wax. The combined lamination now passes through a series of printing rollers such carrying out the processes of either offset lithography or offset rotogravure or flexography, in each instance the ink being transferred to the appropriate surface of the lamination by a resilient blanket (e.g. rubber). Inasmuch as most inks require drying stations, the temperature of which could melt the wax, it is preferred to employ inks containing a catalyst that can be set by ultra-violet radiation. Ultra-violet lamps set the ink, create a minimum amount of heat and do not cause delamination. One of the printing stations may similarly print either or both sides of the lamination with a heat sealable coating such as lacquer. This may be done when the liner sheeting is not inherently thermoplastically adhesive but has to be provided with a heat-sealable coating. Such a coating may be applied as a heat seal pattern. The web now passes through a second rotary die cutting station. The web, having left the second die cutting station, emerges in the form of multiple rows of shingled blanks now being transported on a slow moving conveyor. It is important to note that tension control must be maintained both longitudinally with respect to the board as well as to the liner. In the case of lightweight liners, tension control must also be maintained transversely across the web else wrinkling will occur. Registration between the first die cutting, the printing and/or coating and the final profiling is maintained by photoelectric cells which scan the cut-outs described by the first die cutting operation. These scanners signal devices which either retard or advance the web's travel through the various rotating stations. Through the use of this technique, it becomes practical, if one should wish, to apply the wax in an adhesive pattern as registration can be maintained in the manner just described. Even after the liner material is laminated to the board, the initial cut-outs still can be scanned even though they are now covered by liner material as the board and the overlying liner would be of a different hue and such distinction would be distinguishable by photoelectric means.

Whereas the preferred embodiments describe unsupported web or membrane areas on only one surface of the blank, it is apparent that, by laminating two sheetings, one on either surface of the substrate, two plies of unsupported sheeting may be provided on the same blank. Returning to the unifying element of the invention, in each instance, unsupported impermeable sheeting is used to help produce a sealed joint or closure in connection with main panel walls of a pack. In one instance, a closure occurs at the end flaps of a tubular carton, and in another instance, the corner joints are formed connecting the sidewalls of a tray lined with an interior bag. In the third illustrated instance, a side seam of an overwrap package is first formed and thereafter end seals of such overwrapped package are completed.

In the various examples described above the heat-weakenable laminating material Z has a melting temperature between 140° and 190°F and the moisture-resistant sheeting Y is heat-sealable at a temperature greater than the melting temperature of the laminating material. In general, the sheeting Y should have a melting point above 200°F.

I claim:

1. A moisture barrier package formed from a single blank comprising a lamination of a fibreboard substrate and heat-sealable moisture-resistant sheeting laminated together by a heat-weakenable laminating material, said blank having parallel fold lines defining two pairs of opposed body walls plus a side-seam flap, one lateral edge portion of said sheeting which forms the body wall to which said side-seam flap attaches constituting a web unsupported by said substrate, said package having an over-all exterior covering constituted by said sheeting and having a side seam, a zone of which is formed by a heat-sealed bond between said unsupported sheeting portion and the underlying heat-sealable sheeting surface of said flap, said package also having a top closure including (a) an inner closure flap hinged to a front body wall which flap has been delaminated from its external heat-sealable sheeting, (b) an opposed sheeting closure panel which is hinged to a rear body wall and which is unsupported by substrate, and (c) two gussets on each side edge of said opposed closure panel which connect it to the upper edges of said remaining opposed pair of body walls, one gusset on each side being unsupported by said substrate and the other being supported, said gussets overlying said inner closure flap and being respectively heat-sealed together and to said unsupported closure panel, said delaminated sheeting flap overlying said opposed closure panel and being heat-sealed thereto.

2. The package of claim 1 wherein a portion of said side-seam flap is secured by adhesive to said body wall at a location adjacent said unsupported lateral edge portion thereof.

3. A top-loading package in the form of a tray and a hinged cover having a moisture-barrier interior lining, which package is formed from a single blank comprising a lamination of a unitary fibreboard substrate and a heat-sealable moisture-resistant sheeting laminated together by a heat-weakenable laminating material, the shape of said substrate being dissimilar to the shape of said sheeting so that selected peripheral web portions of said sheeting are unsupported by said substrate, said tray having four side walls connected to one another by generally triangular corner panels hinged respectively to the edge of one side wall, said blank being formed with a further triangular panel hinged to each said first-mentioned triangular panel and with an unsupported sheeting web portion of generally triangular shape joining each said further triangular panel to its adjacent sidewall, said blank being folded so that said unsupported web panel is disposed between said further triangular panel and the outer surface of the adjacent sidewall and being heat-sealed to both to provide a sealed corner, three of said sidewalls having sealing flaps hinged to the upper edges thereof and said cover including three cooperating sealing panels hinged thereto, said sealing flaps and panels being heat-sealed to one another to completely close said package interior lining, and the substrate of said cover and its hinged sealing panels being delaminated from the sheeting portion thereof.

4. A top-loading package in accordance with claim 3 wherein small panels are hinged to the upper edges of each of said first-mentioned triangular panels and wherein said cover is formed and proportioned to heat-seal with said small panels at the time said cooperating sealing panels and flaps are heat-sealed.

* * * * *